(12) United States Patent
Kobayashi (10) Patent No.: US 8,724,196 B2
(45) Date of Patent: May 13, 2014

(54) IMAGE PROCESSING DEVICE (76) Inventor: Masahiro Kobayashi, Hyogo (JP)

( * ) Notice: Subject to any disclaimer, the term of this patent is extended or adjusted under 35 U.S.C. 154(b) by 306 days.

(21) Appl. No.: 13/145,388

(22) PCT Filed: Dec. 24, 2009

(86) PCT No.: PCT/JP2009/007201
§ 371 (c)(1),
(2), (4) Date: Jul. 20, 2011

(87) PCT Pub. No.: WO2010/089836
PCT Pub. Date: Aug. 12, 2010

(65) Prior Publication Data
US 2011/0273748 A1 Nov. 10, 2011

(30) Foreign Application Priority Data

Feb. 6, 2009 (JP) ................. 2009-025941

(51) Int. Cl.
G06K 9/38 (2006.01)
G03F 3/08 (2006.01)
(52) U.S. Cl.
USPC .......................................... 358/522; 382/172
(58) Field of Classification Search
USPC ............................ 358/448, 522; 382/168–172
See application file for complete search history.

(56) References Cited

U.S. PATENT DOCUMENTS 5,808,697 A * 9/1998 Fujimura et al. ............... 348/672
5,987,176 A * 11/1999 Imaizumi et al. ............. 382/232
7,136,581 B2 11/2006 Fujii
7,302,110 B2 11/2007 Chesnokov
7,639,893 B2 * 12/2009 Duan et al. .................... 382/274
7,826,662 B2 11/2010 Kato et al.

FOREIGN PATENT DOCUMENTS

| JP | 2002-142150 A | 5/2002 |
| JP | 2003-051944 A | 2/2003 |
| JP | 2004-530368 A | 9/2004 |
| JP | 2005-055744 A | 3/2005 |
| JP | 2007-124087 A | 5/2007 |
| JP | 2007-234034 A | 9/2007 |

OTHER PUBLICATIONS

Saito, Fumihiko, "Optimal Parameters Estimation in Local Adaptive Contrast Enhancement Using Genetic Algorithm", The Journal of the Institute of Image Electronics Engineers of Japan, Oct. 25, 1999, vol. 28, No. 5, p. 669.

Shimoyama, Sosuke, "Evaluation of High Speed and High Quality Dynamic-Range-Compression Method Using Local Histogram Equalization", Proceedings of the 2008 IEICE General Conference, JOHO System 2, Mar. 5, 2008, p. 24.

* cited by examiner

Primary Examiner — Barbara Reinier
(74) Attorney, Agent, or Firm — Carrier Blackman & Associates, P.C.; Joseph P. Carrier; William D. Blackman (57) ABSTRACT An image processing device for a still image and for every frame of a moving image includes an uptake unit to take image data of a pixel unit from a captured image of a subject, a histogram generating unit to generate a histogram of the brightness after having disintegrated the data into a particular color space, and a control unit which reads out the image based on a predetermined reading pattern according to color, and sets the brightness of a pixel at a particular position of the reading pattern based on a mean histogram of a pixel removed (lifted) from the particular position in the pattern.

5 Claims, 9 Drawing Sheets

IMAGE PROCESSING DEVICE

CROSS-REFERENCE TO RELATED APPLICATIONS

The present application is a U.S. National phase of, and claims priority based on PCT/JP2009007201, filed 24 Dec. 2009, which, in turn, claims priority from Japanese patent applications 2009-025941, filed 6 Feb. 2009. The entire disclosure of each of the referenced priority documents is incorporated herein by reference.

TECHNICAL FIELD

This invention relates to an image processing device which converts an image containing a mixture of extremely bright and dark parts into a clear, easily viewed picture.

BACKGROUND ART

A surveillance camera may operate for 24 hours a day therefore, extremely bright images and extremely dark images are recorded every moment.

The general automatic gain control of the camera often cannot keep up with an extremely large change. Also, when an extremely dark part and bright part are mixed within the same picture, such as an indoor window, it cannot be dealt with by the automatic gain control.

As a conventional image evaluation technique, a method is known that uses a histogram to make a graph using a number of pixels, according to the brightness of each color. This method shows the pixel distribution in the image, it displays the detail of a shadow (the left-hand portion of the histogram), a halftone (the center of the histogram) and the highlight (the right-hand portion of the histogram), and judges whether this detail makes sufficient adjustment to an image for it to be clearly viewed.

For example, an imaging device is described in Prior art 1. This imaging device comprises; an imaging element to output an electrical signal performing photoelectric conversion of an optics image, signal processing means to generate a video signal processing an electrical signal output by said imaging element, a histogram circuit which generates a histogram from a video signal output by the said signal processing means, and an exposure control means using a histogram detected by the said histogram circuit.

An image processing method is described in Prior art 2. This image processing method comprises; a process to generate an image by reading light from a manuscript, a process to make a histogram of the density distribution from the image data, a process to generate a density amendment curve based on a ratio of the number of data of parts which came close to light and shade at both ends of the density distribution corresponding to a number of all parts of the image data, and a process to make a density amendment of the image data using the density amendment curve.

An imaging device is described in Prior art 3. This imaging device includes an imaging means and a gradation correcting means. The imaging means captures an image of a subject, and the image data of the subject is acquired. The gradation correcting means modifies a pixel portion which is a predetermined pixel portion of an imaging image consisting of image data acquired by imaging means and a pixel portion comprising pixels that have a brightness level which is within a predetermined range, so as to harmonize the same.

PRIOR ART—PATENTED DOCUMENTS

[Prior Art 1] Japanese Laid Open Patent Publication (tokkai) No. 2002-142150

[Prior Art 2] Japanese Laid Open Patent Publication (tokkai) No. 2003-051944

[Prior Art 3] Japanese Laid Open Patent Publication (tokkai) No. 2007-124087

Regarding Prior art 1, for example, when a still image is captured, for a histogram of the imaging image generated by a histogram section, it is retrieved using a CPU and includes a luminance range where it is distributed over the brightness of useful data and a luminance range over which brightness is not distributed (a useless data range). This is difficult for processing the still image photography in real time when a CPU with a large processing capacity is not used and with a picture which contains a large number of pixels.

Regarding Prior art 2, in the case of color mode, a high level image processing system is required for processing a histogram which synthesizes R, G, B colors, and in the case of gray mode, a high grade image processing system is also required for processing a histogram which generates a histogram only for G color. That is, when a high capacity host computer is not used, there are problems in that the processing time is greatly increased.

Regarding Prior art 3, a gamma adjustment (gradation adjustment) is performed according to an adjustment curve using the histogram of the imaging image. For example, when a distribution has two peaks, enough gradation is assigned to a recorded image while maintaining overall gradation relations on a dark part (a long-distance background) and a bright part (the subject of the short distance), for the purpose of eliminating the useless data range (the luminance range over which brightness is not distributed) that was on the high intensity side by expanding the range of both peaks on the high intensity side. However, by this method, there is a problem in that it is not practical for a moving image, because it takes too much time to calculate a histogram of the whole image with a large number of pixels.

SUMMARY OF THE INVENTION

In order to solve the above-mentioned problems, the present invention provides an image processing device which processes a still image or every frame of a moving image, comprising: an uptake means which takes image data of a pixel unit from a captured image of a subject, and a histogram generating means which generates a histogram of brightness after having disintegrated the image data in a particular color space and read out the image data based on a predetermined reading pattern according to color, and control means which determines the brightness of a pixel at a particular position of the reading pattern based on the histogram using an algorithm, and then similarly determines the brightness for all other pixels in the image data from the pixel unit on a pixel by pixel basis.

When determining the brightness of each of the other pixels, it is preferable to move the predetermined reading pattern according to a predetermined rule whereby, after having set the brightness of the pixel of the particular position, a histogram of the predetermined pattern is generated after the pattern is moved and is compared to a histogram of the predetermined pattern prior to being moved. Each of the pixels in the histogram prior to being moved which is not duplicated in the histogram after movement is subtracted from the area of the predetermined pattern, and each of the pixels in the histogram after movement which is not in the histogram prior to being moved is added to the area of the predetermined pattern for determining the brightness of the pixel at the particular position of the reading pattern which has been moved.

In a case where the whole predetermined pattern is in a display area for the image, it is preferable to move a pixel and a predetermined pattern according to maintaining a predetermined overlap portion under the predetermined rule.

Effect of the Invention

The algorithm of the present invention is a relatively simple algorithm to directly obtain an equal (the same) image processing result without having to use a conventional 2 pass (route) method. It is possible to perform a real-time processing of VGA animation by combining a graphic board and an inexpensive microcomputer or personal computer. Also, using hardware equipped for field programmable gate array (FPGA) is possible, and processing with digital signal processing (DSP) is possible, too.

DETAILED DESCRIPTION OF PREFERRED EMBODIMENTS OF THE INVENTION

A best mode for carrying out the invention is described below in conjunction with the appended drawings. Note that in the present invention, an old-type graphics board is not used. It is desirable to use a graphics board based on a multi-core GPU having 120 or more cores per processor.

Figure 1:
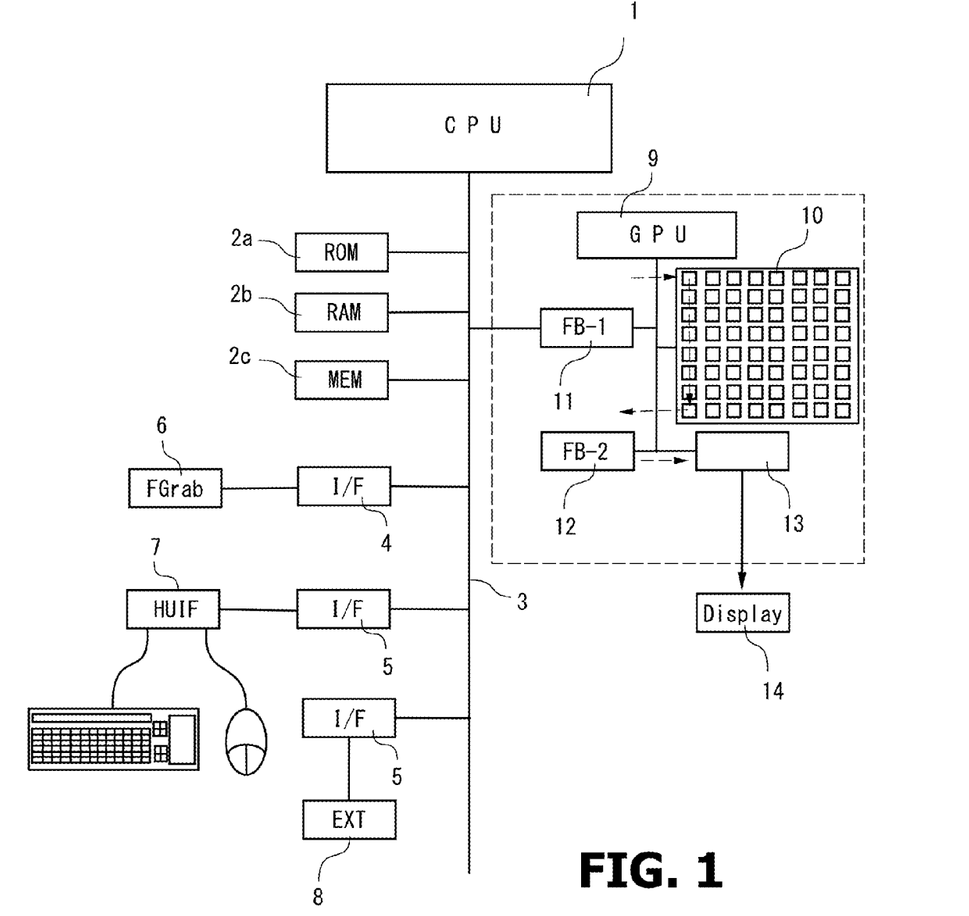
FIG. 1 A figure showing a basic example—embodiment of a system according to the present invention.

As shown in FIG. 1, the present system is basically a micrcomputer or a personal computer equipped with a graphics board. CPU 1 comprises frame grabber 6, an image is taken into this frame grabber 6 through system bus 3 and interface 4 such as a graphics board, ROM 2a, RAM 2b, PCI. Also, for operating the devices, the present system has operation devices 7 such as buttons and/or external connections ports 8 such as serial port through I/O interface 5.

The graphics board is comprised of GPU 9 having one parallel computation cell 10, processing frame buffer 11, output frame buffer 12, and indication output circuit 13.

The image processing method of the present invention has the above constitution when processing either every frame of an animation (moving picture) or a still image. That is, the present invention comprises an uptake means and a histogram generating means. The uptake means take the image data of the pixel unit from the image—photograph of a subject, the histogram generating means generates a histogram of the brightness after disintegrating the image data into a particular color space. The image is read out based on a predetermined reading pattern according to color by the uptake means, a mean histogram around a pixel of the particular position in the predetermined reading pattern is generated using the histogram generating means, and the brightness of the pixel of the particular position is set using this mean histogram.

GPU 9 receives instructions from CPU 1 and processes the image data in processing frame buffer 11 according to the instructions to each cell, in order that a processing result is written in at frame buffer 12 for output. The parallel computation cell 10 includes plural cells which are used in performing parallel computations, the instructions from the CPU 1 are processed by the number of cells simultaneously.

The CPU 1 of the computer transfers software corresponding to the processing of this matter to RAM 2b from ROM 2a at the start, and the software carries out the processes. The software initiated repeats a series of tasks as follow.
(1) An image is taken from a frame grabber
(2) The image taken in is transferred to the processing frame buffer 11 on the graphics board
(3) Handling of this matter is indicated to GPU
(4) The parallel computation cell 10 of the GPU performs instructions by parallel computation
(5) Wait until all processing results are written in at the output frame buffer for output
(6) Processing result is displayed.

A plurality of color spaces can be represented with the processing frame buffer 11 and the output frame buffer 12 for output, YCbCr, HSV, Lab, HLS are intended for use in this matter Indication output circuit 13 converts the details of the output frame buffer 12 becoming a color space expression into a video signal that is adapted to be displayed on display 14. Indication output circuit 13 supports a plurality of video signals, analog RGB is general, DVI a component (D1-D4), YC separation, and composites can be output.

The image processing method of the present invention treats an image of every moving picture frame or still image, and involves an uptake means and a histogram generating means. The uptake means takes the image data of the pixel unit from the image—photograph of a subject, and the histogram generating means generates a histogram of the brightness after disintegrating the image data into a particular color space. The image is read out by a predetermined reading pattern according to color by the uptake means, a mean histogram around the pixel of the particular position in the pattern is generated using the histogram generating means, and the brightness of the pixel of the particular position is set using this mean histogram. The image brightness information is read out with predetermined reading pattern 16, and the brightness of the pixel of the particular position of predetermined reading pattern 16 is set on the basis of the mean histogram except for the pixel of the particular position in predetermined reading pattern 16.

Also, when the predetermined reading pattern 16 is move in the horizontal scanning direction, the compatibility of data is guaranteed even if reading pattern 16 is moved on the image, by overlapping the predetermined reading patterns 16 before movement and after movement in a preset overlap area.

By the above, it is possible to basically process dynamic data as a stream by using the GPU of the graphics board for calculation rather than the CPU of the computer. To put the operation processing process in a nutshell, data are analyzed in real time, and highly precise, high-speed processing can be performed.

In the operation process in a nutshell: pipeline processing is used so that the parallel computation of dynamic data is possible, a GPU used in the present embodiment becomes a 128 scalar processor with an arithmetic unit that enables parallel computation, whereas the core number of a conventional multi-core CPU is 2-4 cores.

Even if a scalar processor is used, the real-time processing of the image has vast computational complexity. Therefore there is the example in which a GPU of 960 cores is used for 3D graphics, but, in the present conditions even it has insufficient computing power. The present invention enables the histogram optimization of a moving image in real time even using a GPU having insufficient performance for 3D processing.

Figure 2A:
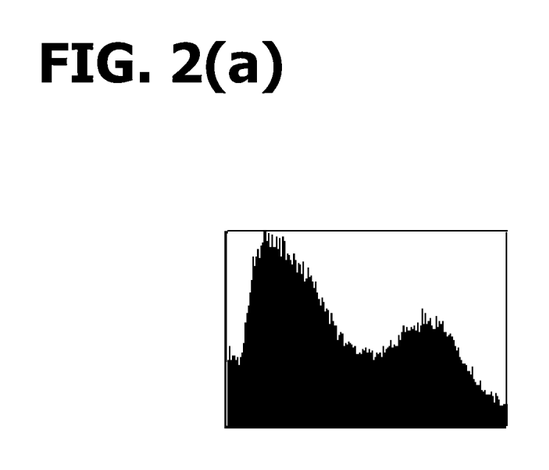
FIGS. 2(a), 2(b) Figures showing a comparative example and an invention example of a histogram before and after processing according to the invention.
Figure 2B:
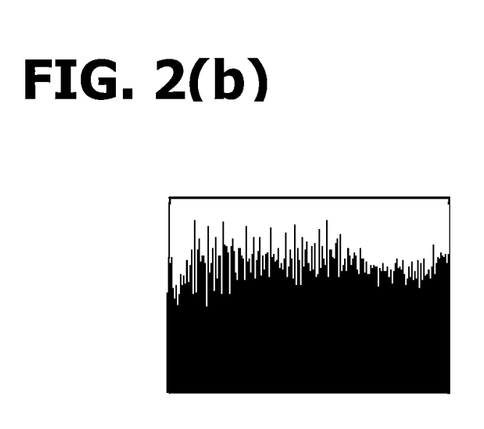

FIGS. 2(a), 2(b) show a comparative example of a histogram which is processed according to the present invention, in which FIG. 2 (a) shows an example original histogram having two peaks, one to the right and the other to the left, and FIG. 2 (b) shows a histogram which is equalized by the processing of the present invention and has become relatively flat.

Generally, when the brightness of the image is not uniformly distributed the image is improved through adjusting the brightness distribution by averaging the histogram, or widening the contrast by extending a low image of the contrast using gamma curve conversion having an S-curve, then, the dark point is darkened, and the bright point is lightened, so that it is worked to turn it into a well-controlled image.

If the histogram is averaged, as for the dark part, the detail becomes clear. However, if there are many dark parts, then a part of the sky and a part in contact with the sky become too bright, and detail is impaired. To reduce the damage to the detail of such transition section, for example, divide the area into a part of the sky (bright part), a part of the border of the sky and the ground, and a part of the ground, and average the histogram for each part.

Also, it is possible to extract a detail of the medium portion of the image where brightness and darkness are extreme, by scanning an image beforehand and detecting the brightness distribution, and averaging the histogram in a distributed area.

This is a two pass (step) method, because an image is scanned to divide the area and scanned once again to average the histogram.

The said method cannot be carried out quickly when a moving image is to be processed in real time, and the algorithm to divide an area becomes difficult and complicated.

Also, the same level memory which stores an image of a division result is required, because it is necessary to convert an image according to a table after the full screen has been scanned and a brightness conversion table has been made.

In addition, in the said method, it is necessary to scan an image four times in total, twice for dividing the area and twice for averaging the histogram.

However, as described in the details below, a benefit of the present invention is that the averaging of the histogram can be processed in only one pass, because, in assuming a calculation area to be one pixel, a calculation process for dividing an area is not necessary.

Figure 3A:
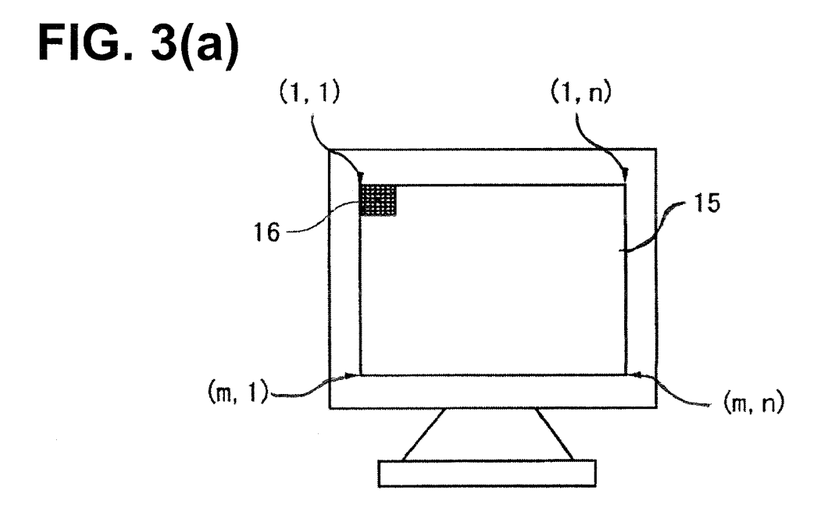
FIG. 3(a) A figure showing the positional relations of a display picture and a predetermined reading pattern according to an embodiment of the present invention.
Figure 3B:
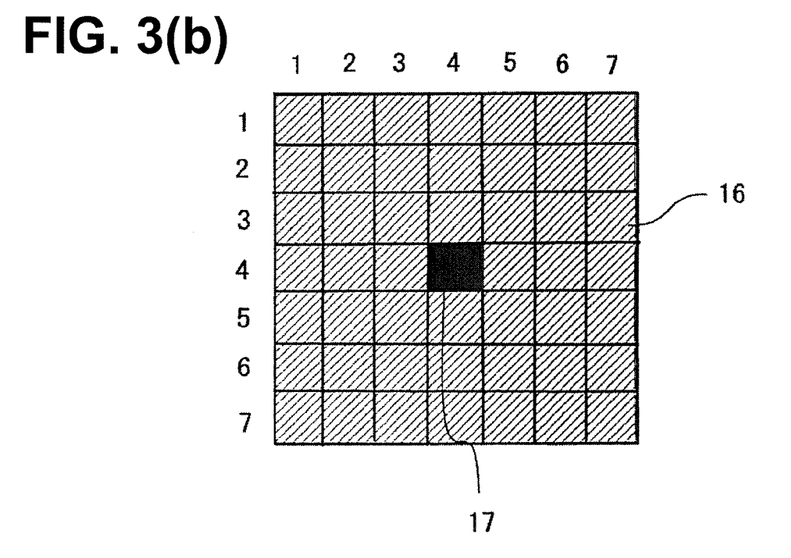
FIG. 3(b) An enlarged view of the predetermined reading pattern in FIG. 3(a).

FIGS. 3(a)-3(f) show the positional relations of an image-picture and the predetermined reading pattern, of which FIG. 3a shows the whole of a display picture displaying an image and shows a predetermined reading pattern 16 in the display picture 15.

In the present invention, an image processing method adopted is described below in detail. That is, after setting the brightness of the pixel of the particular position, for setting the brightness of another pixel in the image move the pixel and the predetermined reading pattern according to a predetermined rule when generating the mean histogram of the predetermined reading pattern after the movement, subtract the histogram of the pixel(s) which are not duplicated in the predetermined reading pattern before and after moving, and then add the histogram of the pixel(s) which are newly put into the area of the predetermined reading pattern after the movement.

Herein, when it is assumed that the display picture is comprised of the pixels of m lines and n rows, if sequence is represented in (line, row), a picture begins with pixel (1, 1), the first line terminates in the pixel (1, n), and the final pixel is represented in (m, n).

FIG. 3 (b) shows a predetermined reading pattern 16, and a particular pixel is set as the target pixel 17 in the reading pattern 16.

FIG. 3 (c) shows the processing image area in the display picture. To carry out averaging the histogram, in the case that all of reading pattern 16 is not in the display picture 15, different histogram average algorithms must to be used, and as a result, extra processing time is required in comparison to a method for averaging the histogram which uses only one algorithm.

Figure 3C:
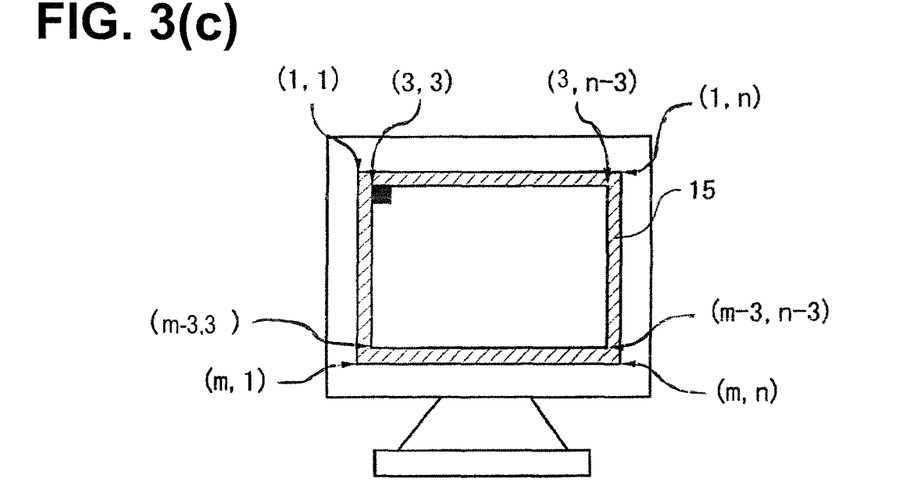
FIG. 3(c) A figure showing the positional relations of a limited processing image area within the display picture and the predetermined reading pattern.

Thus, in the present invention, a processing picture area is limited to an area that is smaller than and entirely within the display picture 15, and correspondingly all of reading pattern 16 is put to the display picture 15 every time. As a result, the need to make a judgment as to whether or not all of reading pattern 16 is in the display picture 15 can therefore be omitted.

Specifically, for example, when the predetermined reading pattern 16 is comprised of seven cells, a non-scan area of 3 cell width in each line and each row may be set, and assume an area surrounded by (3, 3), (3, n−3), (m−3, n−3), (m−3, 3) as a processing picture area, thereby, the predetermined reading pattern 16 will exist in the display picture 15 each time.

When processing to average the histogram of all pixels in the area surrounded by (3, 3), (3, n−3), (m−3, n−3), (m−3, 3) is finished, the data of an area surrounded by (4, 4), (4, 6), (6, 6), (6, 4) are copied and translational movement is made in the area surrounded by (1, 1), (1, 3), (3, 3), (1, 3). That is, the data of the pixel (1, 1) are replaced for the data of the pixel (4, 4) and the data of the pixel (3, 3) are replaced for the data of the pixel (6, 6), with reference to FIG. 3(d).

Figure 3D:
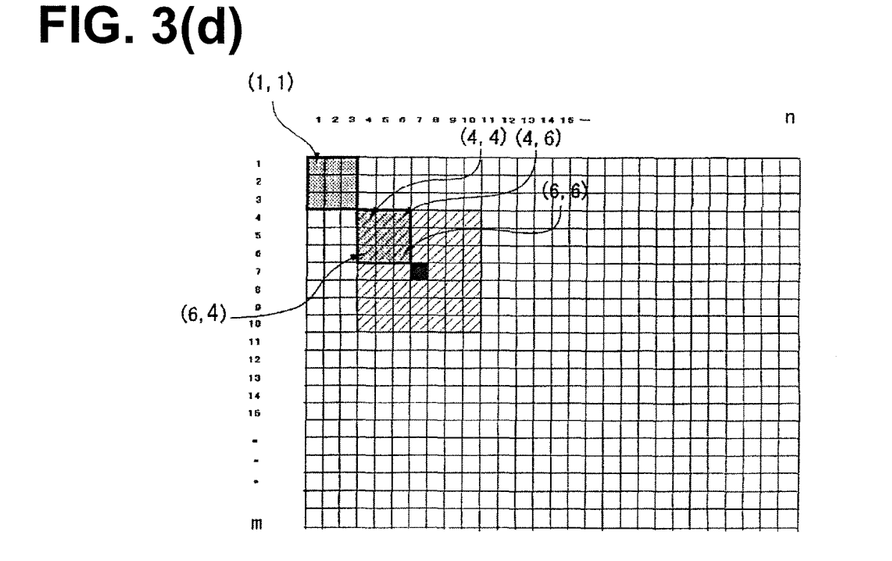
FIG. 3(d) An enlarged view of a predetermined reading pattern in the limited processing image area of FIG. 3(c).

Likewise, the data of an area surrounded by (m−5, 4), (m−5, 6), (m−3, 4), (m−3, 6) are copied and translational movement is made in the area surrounded by (m−2, 1), (m−2, 3), (m3, 3), (m, 1).

Figure 3E:
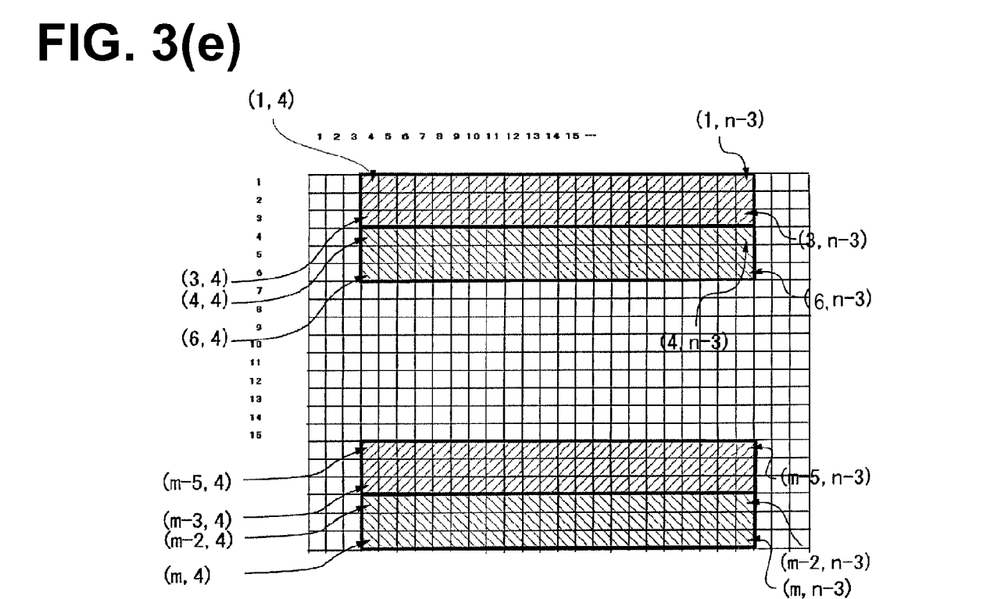
FIG. 3(e) A figure showing a method of data copy in the picture display according to an embodiment of the present invention.

FIG. 3(e) illustrates the method of data copy of 1~3 lines and m−2~m except for the four corners of the display picture. That is, the data of an area surrounded by pixels (4, 4), (4, n−3), (6, n−3), (6, 4) is copied and shifted to the upper direction for 3 cells, and the data of the area surrounded by pixels (4, 4), (4, n−3), (6, n−3), (6, 4) is replaced for the data of the area surrounded by pixels (1, 4), (1, n−3), (3, n−3), (3, 4).

Likewise, the data of an area surrounded by pixels (m−5, 4), (m−5, n−3), (m−3, n−3), (m−3, 4) is copied and shifted in the down direction for 3 cells, and the data of the area surrounded by pixels (m−5, 4), (m−5, n−3), (m−3, n−3), (m−3, 4) is replaced for the data of the area surrounded by pixels (m−2, 4), (m−2, n−3), (m, n−3), (m, 4).

Figure 3F:
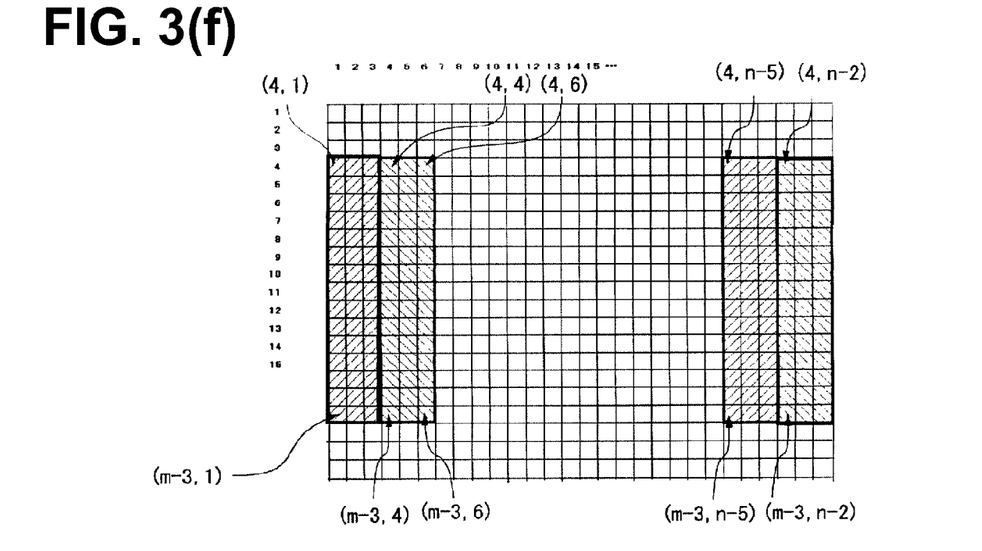
FIG. 3(f) A figure showing a method of data copy in the picture display according to an embodiment of the present invention.

FIG. 3(f) illustrates the method of data copy of 1~3 rows and n−2~n except four corners of the display picture. That is, the data of an area surrounded by pixels (4, 4), (4, 6), (m−3, 6), (m−3, 4) is copied and shifted to the left direction for 3 cells, and the data of the area surrounded by pixels (4, 4), (4, 6), (m−3, 6), (m−3, 4) is replaced for the data of the area surrounded by pixels (4, 1), (4, 3), (m−3, 3), (m−3, 1).

Likewise, the data of an area surrounded by pixels (4, n−5), (4, n−3), (m−3, n−3), (m−3, n−5) is copied and shift to the right direction for 3 cells, and the data of the area surrounded by pixels (4, n−5), (4, n−3), (m−3, n−3), (m−3, n−5) is replaced for the data of the area surrounded by pixels (4, n−2), (4, n), (m−3, n), (m−3, n−2).

Herein, the histogram of this invention is defined as the distribution of the brightness of each pixel in the histogram extraction area. When the brightness is eight bits of information, it becomes 256 sequences showing the brightness.

As described above, regarding a too bright or too dark image, the detail extraction becomes possible by averaging the histogram, regarding the image in which bright parts and dark parts are mixed, the detail of the transition section can be extracted by averaging the histogram in each of plural divided areas separately.

However, it can be expected that the algorithm to divide an area will be complicated, also, handling of fading is required to connect the border of the area on an image naturally, whereas detail can be extracted more naturally when an area is small and multiply divided. However, when an area is too narrow, the connection with the periphery of the area becomes unnatural, and a detail of the same size as the area cannot be extracted.

Thus, the inventor of the present invention realized that, if a calculation area is assumed as being one pixel, to decide the brightness of the pixel, a calculation for averaging of the histogram is performed using a neighboring histogram.

The following advantages are achieved by assuming a calculation area of one pixel.

A calculation process dividing an area becomes unnecessary, and averaging of the histogram will be carried out in just 1 pass.

It is not necessary to take into consideration the composition of the border area.

The problem of losing a detail the same size as the area can be avoided.

However, a calculation to average the histogram is required to all pixels (VGA approximately 300,000), whereby an algorithm to reduce this computational complexity is required.

A subscript number of the sequence as brightness, the number of pixels with the brightness is stored in each element.

Generally, it is possible to scan an area after having cleared the sequence and, to gain the brightness of the pixel, it is implemented by incrementing an element of each sequence.

In this algorithm, the histogram is calculated by a pixel unit, then the above described calculation is required to calculate the histogram of the first target pixel 17, e.g., (4, 4). However, the second target pixel 17, e.g., (4, 5), only moves one row to the right, so that it is not necessary to recalculate the entire histogram. Instead, it is possible to simply subtract the histogram of the left row pixels from the total histogram of the predetermined reading pattern 16 and add the histogram of the light row pixels to make a new total histogram for the second target pixel 17.

In this way, calculating an average of the histogram by a pixel unit can greatly simplify the process for updating the histogram for each subsequent target pixel 17.

Also, since the above processing is independent for each line, high-speed processing is enabled with parallel computation using the pixel carried by the general graphics board. When the graphics board has 256 cells, processing is completed in the processing time for 2 lines.

To calculate the average of the histogram, generate a conversion table of the brightness based on the histogram sequence calculated in the foregoing paragraph, and calculate brightness according to the conversion table.

A calculation algorithm (1) (C-language) using the above described conversion table is as follows:
(The brightness assumes 8 bits, "hist" represents a histogram sequence, "table" represents a conversion table sequence, "total" represents the number of pixels in the area)

$$\text{for } (i=n=0; i<256; i++)\{n=n+\text{hist}[i]; \text{table}[i]=n*256/\text{total};\} \quad (1)$$

Then, the brightness of the area is calculated using the following algorithm (2) based on the conversion table.

$$\text{for}(i=0;i<dy;i++)\{\text{for}(j=0;j<dx;j++)\{p=\text{get\_pix}(x+j, y+i); p=\text{table}[p]; \text{put\_pix}(x+j,y+i,p);\}\} \quad (2)$$

In the above, x,y is an area origin, dx,dy is an area range, get_pix(x,y) is a function that acquires the brightness of the former image, put_pix(x,y,p) is a function that stores brightness after the calculation to conversion image.

Herein, in the following algorithm (3), the calculation area is one pixel, thus, the loop calculation described previously is not necessary. And regarding the conversion, it is enough to convert the brightness of the pixel which is a target of the calculation. So that the algorithm (3) having processing equal to algorithms (1) and (2) is as follows, in the case of a black-and-white image.

$$p=\text{get\_pix}(x,y); \text{for}(i=n=0;i<=p;i++)\{n=n+\text{hist}[i];\}$$

$$p=n*256/\text{total}; \text{put\_pix}(x,y,p); \quad (3)$$

In the case of a black-and-white image, the present algorithm (3) itself can just be adapted However, in the case of a colored image, it is usually necessary to divide or separate the color information and the brightness information.

Usually, the averaging of the histogram is processed to each plane of RGB. However, in the present invention, it can be achieved with the processing that is equal to a black-and-white image, because a color space used in JPEG or MPEG is isolated by the basic function of the graphics board, and only the necessary plane need be processed.

Correspondence of color space and the plane to be processed, for example, following is considered.
YCbCr:Y plane
HSV:V plane
Lab:L plane
HLS:L plane Select an input image from the above described color space according to the internal expression of the graphics board, and carry out the processing of only the brightness plane. Thereby it can avoid the need for the RGB conversion processing, to repeat the same process three times and to change the hue.

Figure 4A:
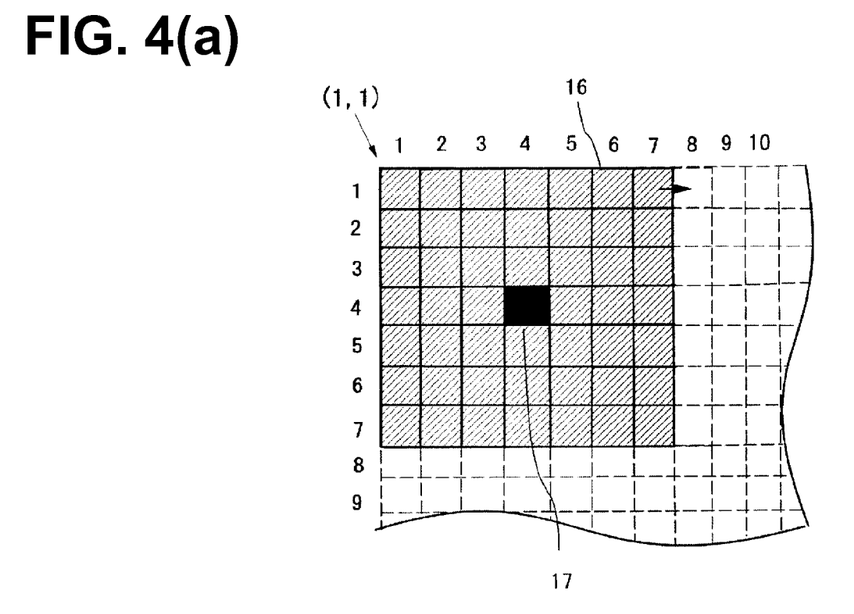
FIGS. 4(a), 4(b) Figures show a method for optimizing histogram calculation according to an embodiment of the present invention.
Figure 4B:
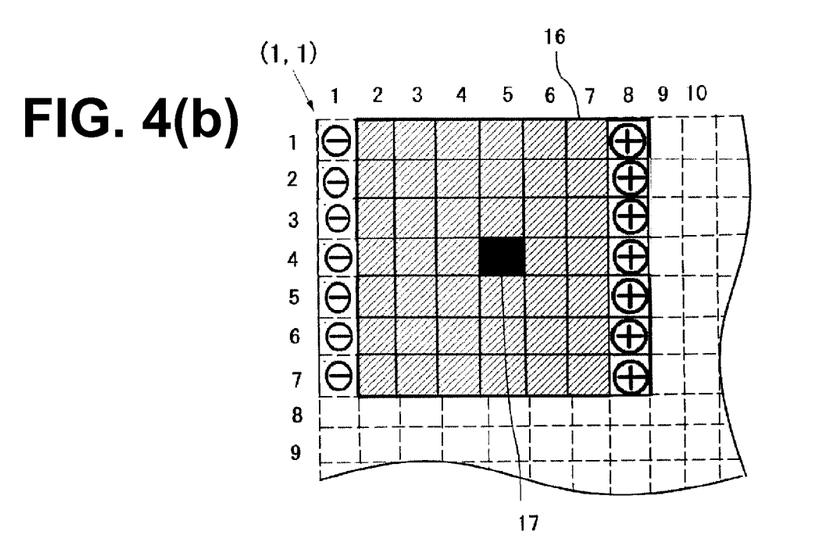

FIGS. 4(a), 4(b) explain the principal of the optimization of the histogram which is detected by a pixel unit. In the present embodiment, as shown in FIG. 4 (a), the histogram of the selected pixels which comprise the predetermined reading pattern 16 is calculated, and the value of the target pixel 17 is calculated according to the algorithm (3), subsequently, the selected pixels for calculating the histogram shift to the right.

FIG. 4 (b) shows condition where the target pixel 17 is moved to the right by one pixel, and in this condition, the selected pixels from the second row to the seventh row among the selected pixels from the first row to the seventh row those are already used for the calculation of the histogram, the selected pixels from the second row to the seventh row are common with FIG. 4 (a), and the pixels of the eighth row are added to the selected pixels from the second row to the seventh row.

Therefore, the pixels from the second row to the seventh row and the pixels of the eighth row become a new object of the calculation. However, it is not necessary to calculate the details of all the pixels again. That is, subtract the first row data from a total value of the histogram which are in the area surrounded by pixels (1, 1), (1, 7), (7, 1), (7, 7), and add the data of the eighth row to the data from the second row to the seventh row, as above. Thus, it can easily calculate the histogram.

In FIG. 4 (b), the area surrounded with a solid line is the calculation area for the next calculation, and the pixel of line 4 row 5 is the target pixel 17 which is the subject of the next brightness calculation, and the area except for the target pixel (4, 5) from the area surrounded with pixels (1, 2), (1, 8), (7, 2), (7, 8) becomes the calculation area. As described above, the actual calculation can be processed in a short time, because only the first row histogram is subtracted from the previously calculated value and then the eighth row histogram is added thereto.

Figure 5A:
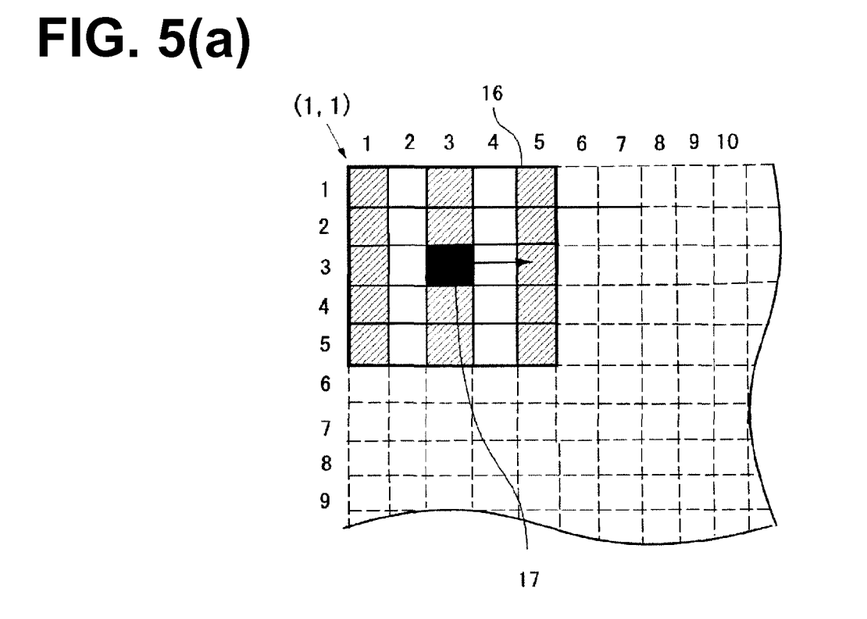
FIGS. 5(a), 5(b) Figures showing a method for calculating a histogram of an individual pixel involving scanning every two lines FIGS. 6(a), 6(b) Figures showing a method for calculating histograms of individual pixels using parallel distributed processing according to an embodiment of the present invention.
Figure 5B:
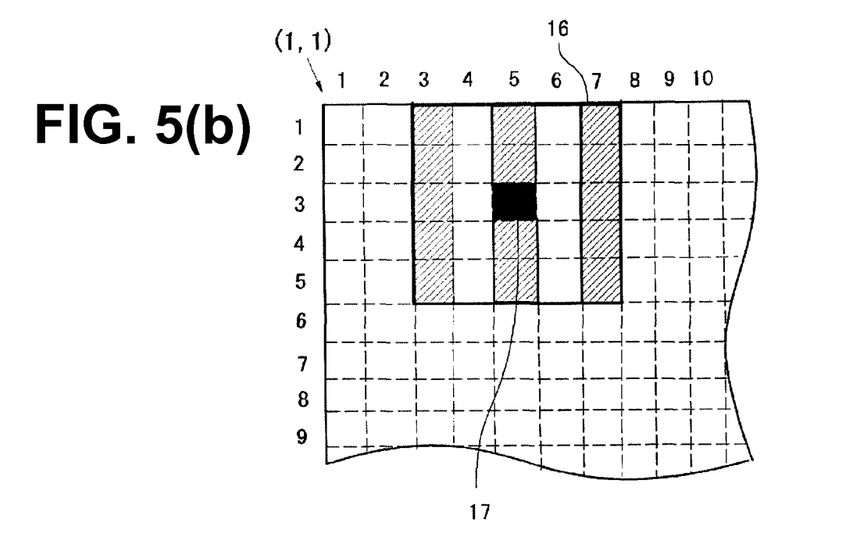

FIGS. 5(a), 5(b) show an embodiment which calculates by moving a pixel one by one. However, the present invention is not limited to this. That is, under the condition where the whole predetermined reading pattern is in the display, it is possible to effect a dramatic reduction in processing by keeping an overlap portion before and after the pattern is moved according to a predetermined rule in the horizontal scanning direction. This reduction makes it possible to speed up the processing while improving the contrast of the whole display. The detail of the high-speed processing is explained below.

At first as shown in FIG. 5 (a), in the area surrounded with pixels (1, 1), (1, 5), (5, 1), (5, 5), the area drawn in hatching, that is, the area from pixel (1, 1) to (5, 1), the area of pixel (1, 3) and (2, 3), the area of pixel (4, 3) and (5, 3), and the area from pixel (1, 5) to (5, 5), is used to calculate the mean brightness of the pixels and determine the value of the pixel (3, 3) which is the target pixel 17.

Subsequently, as shown in FIG. 5 (b), the predetermined reading pattern is moved by 2 pixels horizontally, pixel (3, 5) is assumed as a target pixel, and the mean brightness of the pixels in the area surrounded with pixels (1, 3), (1, 7), (5, 3), (5, 7), that is, the area from pixel (1, 3) to (5, 3), the area of pixel (1, 5) and (2, 5), the area of pixel (4, 5) and (5, 5), and the area from pixel (1, 7) to (5, 7) is calculated, and the value of the pixel (3, 5) which is the target pixel 17 is determined.

Figure 6A:
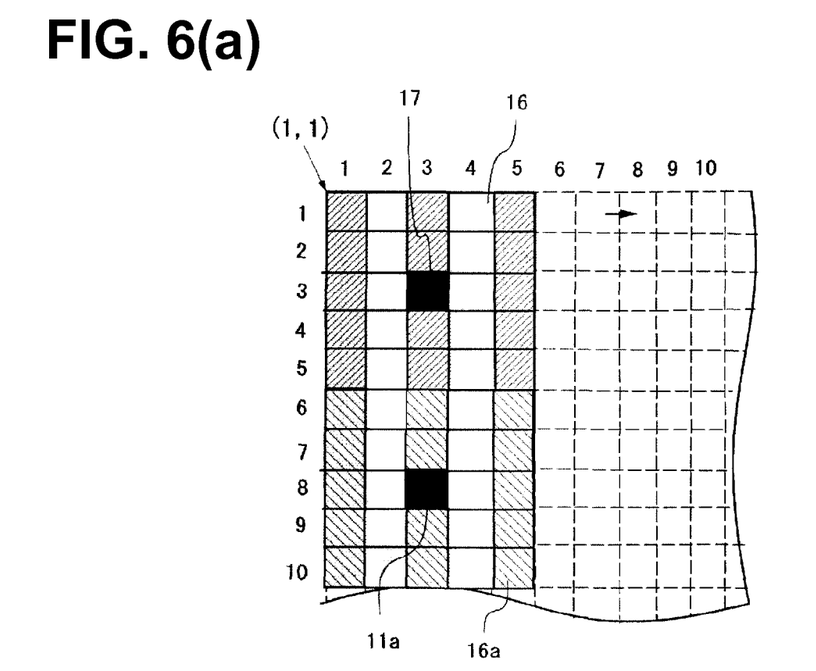
Figure 6B:
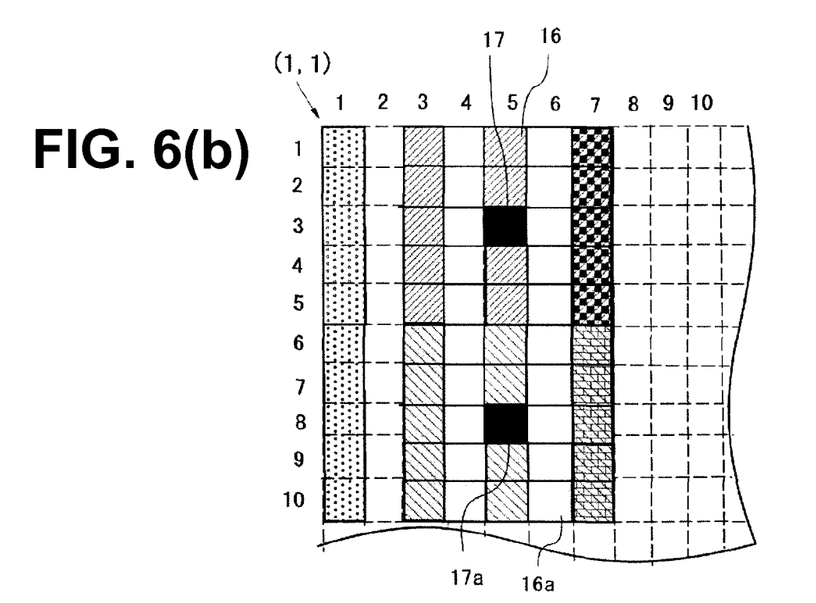

FIGS. 6(a), 6(b) show an embodiment of the parallel computation according to the present invention. It can shorten calculation time by dispersing to a plurality of calculation cells and performing parallel computation. In FIG. 6 (a), the area surrounded by pixels (1, 1), (1, 5), (5, 1), (5, 5) is the first reading pattern 16, and the area surrounded by pixels (6, 1), (6, 5), (10, 1), (10, 5) is the second pattern 16a.

In the first reading pattern 16, the histogram of the pixels (1, 1)~(5, 1), pixel (1, 3) and (2, 3), pixel (4, 3) and (5, 3) and pixels (1, 5)~(5, 5) is calculated, and the value of the pixel (3, 3) using the mean value of the pixels is determined.

In the second reading pattern 16a, the histogram of the pixels (6, 1)~(10, 1), pixel (6, 3) and (7, 3), pixel (9, 3) and (10, 3) and pixels (6, 5)~(10, 5) is calculated, and the value of the pixel (8, 3) using the mean value of the pixels is determined.

Figure 7A:
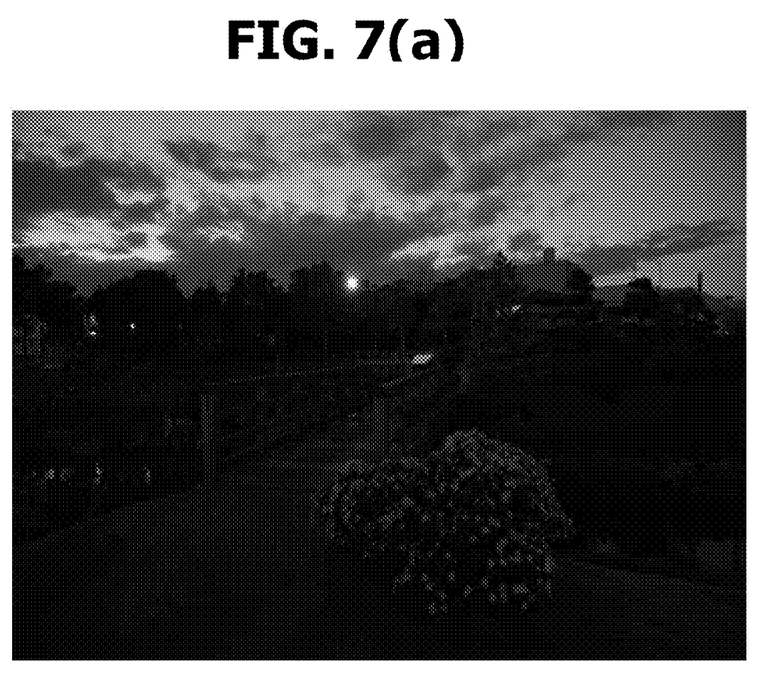
FIGS. 7(a), 7(b) Figures showing an exemplary image before and after processing according to the present invention.

FIG. 7 (a) shows an example of an image before processing according to the present invention, i.e., it shows a photograph of a bridge which is just before a forest. Overall the picture is dark.

Figure 7B:
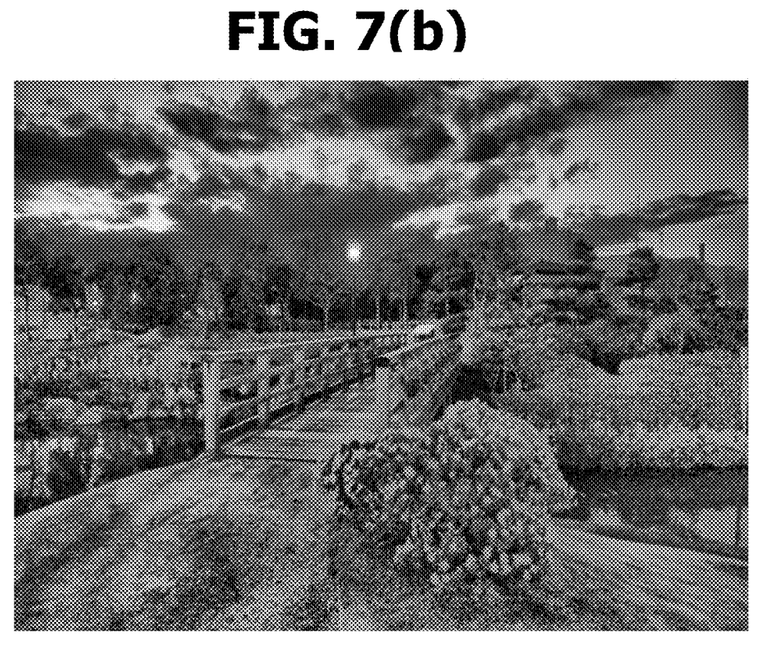

FIG. 7 (b) shows the example of the same image after processing with the present algorithm, in which the bridge just before the forest is seen much more clearly.

An image can be processed in a short time by using the algorithm for image processing according to an embodiment of the present invention. Thus, not only a still image such as shown in FIGS. 5(a), 5(b), but also a video image of a dark scene can be reproduced in real time according to the present invention which provides an effective technique for processing a video image which is a mix an extremely bright and dark parts in the same picture, such as an image from a surveillance camera or an image of an indoor window

INDUSTRIAL APPLICABILITY

The image processing device according to the present invention can achieve a high sensitivity that is almost the sensitivity of a night scope not only for surveillance cameras but also for general video cameras, by using the image processing method of the present invention without the need for an expensive and bright lens.

DESCRIPTION OF THE NUMERALS

1 ... CPU, 2a ... ROM, 2b ... RAM, 2c ... memory, 3 ... system bus, 4 ... interface, 5 ... interface, 6 ... frame grabber, 7 ... operation device, 8 ... external connections ports, 9 ... GPU, 10 ... GPU, memory, 11 ... frame buffer, 12 ... frame buffer, 13 ... indication output circuit, 14 ... display, 15 ... display picture, 16 ... reading pattern, 16a ... reading pattern, 17 ... aim pixel, 17a ... aim pixel

The invention claimed is:

1. An image processing device which adjusts brightness of a still image or of every frame of a moving image, comprising:
uptake means for uptaking image data from a pixel unit of a captured image of an object;
histogram generating means for generating a histogram of brightness after having disintegrated the image data in a particular color space and read out the image data based on a predetermined reading pattern according to color, by generating a mean histogram around a pixel at a particular position in the predetermined reading pattern; and
control means which sets the brightness of the pixel at the particular position of the predetermined reading pattern based on the mean histogram and moves the predetermined reading pattern relative to the image data from the pixel unit according to a predetermined rule, such that after the control means has set the brightness of the pixel at the particular position of the predetermined reading pattern relative to the image data from the pixel unit according to the predetermined rule, the histogram generating means then generates a mean histogram of the moved predetermined reading pattern by subtracting a histogram of pixels in the moved reading pattern which were not duplicated from the histogram of the reading pattern prior to the movement and adding the histogram of pixels newly introduced into the reading pattern by the movement.

2. The image processing device according to claim 1, wherein after setting the brightness of the pixel at the particular position of the predetermined reading pattern, in a case where the predetermined reading pattern is entirely within a processing image area of a display, the control means moves the predetermined reading pattern in a horizontal scanning direction according to the predetermined rule so as to create an overlap portion in the predetermined reading pattern before and after movement.

3. The image processing device according to claim 2, wherein the control means limits the processing image area of the display to be smaller than and entirely within a picture area of the display so that the predetermined reading pattern is entirely within the processing image area of the display when setting the brightness of all pixels of the image data.

4. The image processing device according to claim 1, wherein after setting the brightness of the pixel at the particular position of the predetermined reading pattern the control means sets the brightness for all other pixels of the image data from the pixel unit on a pixel by pixel basis.

5. An image processing device which adjusts brightness of a still image or of every frame of a moving image, comprising:
   uptake means for uptaking image data from a pixel unit of a captured image of an object;
   histogram generating means for generating a histogram of brightness after having disintegrated the image data in a particular color space and read out the image data based on a predetermined reading pattern according to color, by generating a mean histogram around a pixel at a particular position in the predetermined reading pattern; and
   control means which sets the brightness of the pixel at the particular position of the predetermined reading pattern based on the mean histogram,
   wherein the control means includes a central processing unit (CPU) and a graphics board with a graphics processing unit (GPU) with a parallel computations cell that performs instructions from the CPU at plural cells simultaneously.

* * * * *